UNITED STATES PATENT OFFICE.

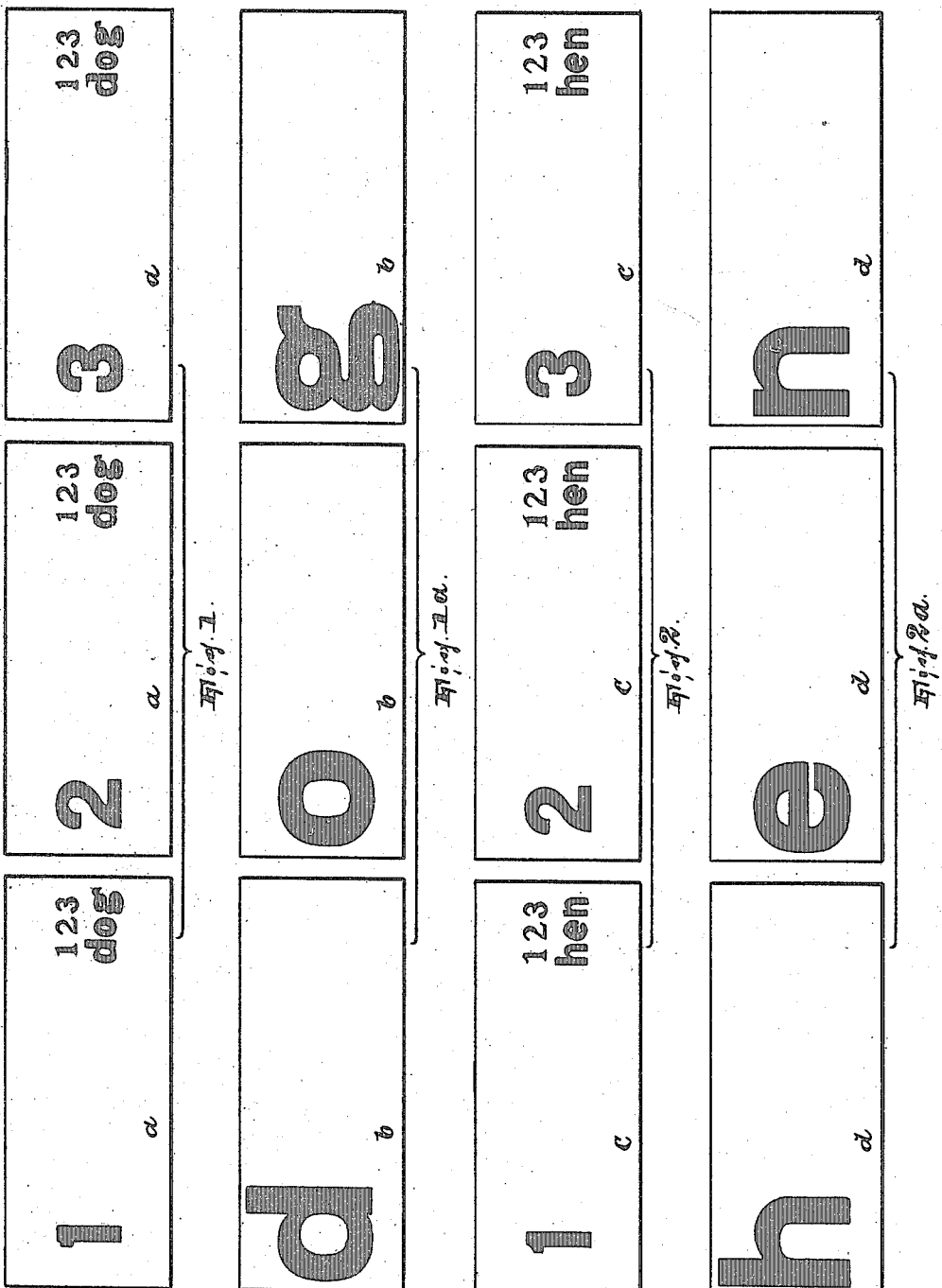

JENNIE L. THOMSON, OF TUNKHANNOCK, PENNSYLVANIA.

MEANS FOR TEACHING THE ALPHABET AND SPELLING.

1,270,566.　　　　　　　Specification of Letters Patent.　　Patented June 25, 1918.

Application filed March 18, 1918. Serial No. 223,074.

*To all whom it may concern:*

Be it known that I, JENNIE L. THOMSON, a citizen of the United States, residing at Tunkhannock, in the county of Wyoming and State of Pennsylvania, have invented certain new and useful Improvements in Means for Teaching the Alphabet and Spelling, of which the following is a specification.

The object of this invention is to provide means for teaching the reading of the letters of the alphabet and spelling whereby the teacher's work will be greatly facilitated both because the interest of the learner will be aroused and because the individuality of the letters and their interchangeability in forming different words will be kept constantly impressed on him from the very outset. The learner, according to this invention, is supposed to known certain characters, for instance, the numerals 1, 2, 3, etc., which serve as indices or identifying characters in the system.

The invention contemplates a set of pieces each having thereon some word, as d-o-g, and a given group of characters respectively associated with the letters of the word on all the pieces in the same way, as d, o, g respectively under 1, 2 and 3, the number of the pieces in the set being the same as the number of letters in the word; in addition, the pieces of each set respectively have all the said letters of the word and the said characters repeated thereon, one such character and letter to a piece, the repeated character being in each instance on the same face as the word and character-group and the repeated letter on a different face but such repeated character and letter occupying otherwise the same relative positions as the corresponding letter-component in the word and character in the character-group occupy,—as to which the following description will afford a more definite understanding.

Preferably there will be several sets of these pieces, all prepared according to the system just stated but presenting different words so as to include all the letters of the alphabet.

Describing the invention now in detail with reference to the preferred form and in connection with the accompanying drawing, in which—

Figure 1 shows the obverse faces of one set of the pieces;

Fig. 1ª shows the reverse faces of the same pieces;

Fig. 2 shows the obverse faces of another set of the pieces; and

Fig. 2ª shows the reverse faces of the pieces shown in Fig. 2.

The pieces shown in the drawings are slips of pasteboard or equivalent sheet material and all alike—elongated—in shape. On the obverse face $a$ of each slip shown in Figs. 1 and 1ª near the right hand end and adapted to be read from one long side thereof are printed some word, as "dog," and, over the respective letters of the word, a group of identifying characters, as 1, 2, 3: it is not of course essential that the position of these characters be over the letters, as any other position in which they would appear respectively associated with them will fall within my invention. Also on the slips are repeated the letters of the word and the characters of the aforesaid character-group, one such letter and character to a slip; the re-repeated character is applied to the same face of the slip as the word and character-group whereas the repeated letter is applied to the opposite or reverse face $b$. Preferably the repeated letter and repeated character are printed at the left end of the slip, directly opposite each other in bold fashion and so that on turning the slip over on its longitudinal axis the repeated letter or character, as the case may be, will be right side up.

As many more such sets of slips, prepared according to the system thus explained, may be provided as—with no two of the sets presenting the same word—will by the use of simple words dispose of all the letters in the alphabet. Such another set is illustrated in Figs. 2, 2ª, where $c$ indicates the obverse and $d$ the reverse faces of the slips.

The sets thus provided are employed thus: Taking one set, as the one presenting the word "dog", the teacher drills into the learner's mind that under 1 is d, under 2 is o, and under 3 is g. When this has been done, as by repeating "under 1 is d, under 2 is o, and under 3 is g" over and over and pointing to the letters each time they are spoken, the teacher brings the learner further to note, first, that the characters 1, 2, 3 are repeated, isolated, on the obverse faces of the slips, and, second, that there is another symbol on the reverse face of each slip. Then repeating the phrase, "under 1 is d, under 2 is o, under 3 is g", accompanied by the learner, and having the latter turn over the slips successively as "under 1", "under 2", "under 3" is spoken, the learner is made to see that also under each repeated numeral (that is, in the sense that it is on the reverse side of the slip) is the same letter as is found under the corresponding numeral in the character-group. In this way, the the learners (especially young children) are discouraged from assuming, frequently for a long time before the teacher perceives it, that each letter of the word presented has significance only in the identical relation to other letters in which it exists in that word, and the individuality of the letters is at the outset impressed on the learner's mind.

For impressing on the learner, further, that other letters exist, and what they are, and that the letters, those already learned and others to be learned, are used to build up other words, *ad infinitum*, the other sets are taken up (for instance the one shown in Figs. 2, 2ª) and employed in the same way.

The principal value of my invention is to impress the learner from the very outset with the individuality of the letters of the alphabet and their entire flexibility in the matter of forming words. To this end, as hereinbefore indicated, a series of sets of pieces presenting sufficient different words so that all the letters of the alphabet are presented will ordinarily serve the purpose.

The arrangement of the word, character group and repeated letter and identifying character on the slips is such that, whereas it brings each repeated letter under the corresponding repeated identifying character, the slips may be arranged to overlap and thus form from the repeated letters the word, thus to show the learner that the resulting word is identical to the word printed on the obverse face of each slip.

Having thus fully described my invention, what I claim as new and desire to secure by Letters Patent is:—

1. A set of faceted pieces for use in teaching each having on one face thereof a given word and a given group of identifying characters respectively associated with the letters of the word, the pieces respectively having said characters and the letters of said word repeated thereon, one such character and one such letter to a piece, the repeated character being in each instance on said face of the respective piece and the repeated letter on a different face thereof but occupying otherwise the same relative positions as the corresponding character in the character-group and letter in the word occupy.

2. A set of flat pieces for use in teaching each having on one face thereof a given word and over the word a given group of identifying characters, the pieces respectively having said characters and the letters of said word repeated thereon, one such character and one such letter to a piece, the repeated character being in each instance on said face of the respective piece and the repeated letter on the opposite face.

3. A set of flat elongated pieces for use in teaching each having on one face thereof and at the right a given word and over the word a given group of identifying characters, the pieces respectively having said characters and the letters of said word repeated thereon at the left thereof, one such character and one such letter to a piece, the repeated character being in each instance on said face of the respective piece and the repeated letter on the opposite face.

4. A plurality of sets of faceted pieces for use in teaching, each piece in a set having on one face thereof a given word and a given group of identifying characters respectively associated with the letters of the word, the pieces in each set respectively having said characters and the letters of said word repeated thereon, one such character and one such letter to a piece, the repeated character being in each instance on said face of the respective piece and the repeated letter on a different face thereof but otherwise occupying the same relative positions as the corresponding character in the character-group and letter in the word occupy, the word on one set being different from that on any other set of pieces in the series.

In testimony whereof I affix my signature.

JENNIE L. THOMSON.

Copies of this patent may be obtained for five cents each, by addressing the "Commissioner of Patents, Washington, D. C."